(12) United States Patent
Scott et al.

(10) Patent No.: US 8,764,852 B2
(45) Date of Patent: Jul. 1, 2014

(54) BATTERY PACK INCLUDING AN ELECTRIC HARNESS AND METHOD OF MANUFACTURING THE SAME

(75) Inventors: John S. Scott, Brookfield, WI (US); Troy C. Thorson, Waukesha, WI (US); Jeffrey C. Hessenberger, Neosho, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 13/458,214

(22) Filed: Apr. 27, 2012

(65) Prior Publication Data

US 2012/0210567 A1  Aug. 23, 2012

Related U.S. Application Data

(62) Division of application No. 12/203,439, filed on Sep. 3, 2008, now abandoned.

(60) Provisional application No. 60/969,841, filed on Sep. 4, 2007.

(51) Int. Cl.
  *H01M 6/42* (2006.01)
(52) U.S. Cl.
  USPC ........................................ 29/623.1
(58) Field of Classification Search
  USPC ........................................ 29/623.1
  See application file for complete search history.

(56) References Cited

U.S. PATENT DOCUMENTS

| | | | |
|---|---|---|---|
| 4,502,211 A * | 3/1985 | Hayes et al. | 29/623.1 |
| 4,507,856 A | 4/1985 | Pearson | |
| 4,528,255 A | 7/1985 | Hayes et al. | |
| 5,789,100 A | 8/1998 | Burroughs et al. | |
| 5,859,523 A | 1/1999 | Nierescher et al. | |
| 6,025,087 A | 2/2000 | Trosper | |
| 6,146,788 A | 11/2000 | Ikeda et al. | |
| 6,152,776 A | 11/2000 | Ikeda et al. | |
| 6,240,637 B1 | 6/2001 | Ikeda et al. | |
| 6,507,196 B2 | 1/2003 | Thomsen et al. | |
| 6,729,908 B2 | 5/2004 | Benson et al. | |
| 6,746,797 B2 | 6/2004 | Benson et al. | |
| 6,773,848 B1 | 8/2004 | Nortoft et al. | |
| 7,292,130 B2 | 11/2007 | Taga et al. | |
| 7,332,363 B2 | 2/2008 | Edwards | |
| 2003/0090855 A1 | 5/2003 | Chu et al. | |
| 2006/0108984 A1 | 5/2006 | Johnson et al. | |
| 2006/0164032 A1 | 7/2006 | Johnson et al. | |
| 2006/0166086 A1 | 7/2006 | Kato | |
| 2008/0254356 A1 * | 10/2008 | Liersch et al. | 429/160 |

OTHER PUBLICATIONS

Dictionary definition of "Molding".*

* cited by examiner

*Primary Examiner* — Ula C Ruddock
*Assistant Examiner* — Frank Chernow
(74) *Attorney, Agent, or Firm* — Michael Best & Friedrich LLP (57) ABSTRACT

A battery pack including an electric coupling assembly. The battery pack includes a top housing, a bottom housing, a cell pad, a plurality of battery cells, a harness, and a circuit board. The harness includes a frame and electric coupler assembly having a plurality of internal and external electric couplings. The internal and external electric couplings include cell couplings and circuit board couplings. The internal and external couplings are held in place during manufacturing by links which are cut after the electric coupler assembly is molded into the frame.

20 Claims, 6 Drawing Sheets

BATTERY PACK INCLUDING AN ELECTRIC HARNESS AND METHOD OF MANUFACTURING THE SAME

RELATED APPLICATION

This application is a divisional of U.S. patent application Ser. No. 12/203,439, filed Sep. 3, 2008, which claims the benefit of U.S. Provisional Patent Application No. 60/969,841, filed Sep. 4, 2007, the entire contents of both of which are hereby incorporated by reference.

BACKGROUND

The present invention generally relates to rechargeable battery packs for power tools. Rechargeable battery packs are available in numerous voltages (e.g., 12v and 21v) and are generally composed of multiple rechargeable battery cells connected either in series or in parallel. Some battery packs are manufactured using battery cells having a chemistry that can be damaged by overcharging (e.g., Lithium-ion). In battery packs containing multiple battery cells, some battery cells may have a different charge level than other battery cells in the battery pack. Recharging such a battery pack may result in overcharging a battery cell that has a higher charge level than other cells in the battery pack. Therefore, some battery packs, employing battery cells with chemistries sensitive to overcharging, monitor and charge each cell separately. Prior battery packs have included a controller to monitor and control charging of the battery cells. These battery packs generally include wires or straps connecting the individual battery cells to a circuit board that includes the controller. During manufacture of such battery packs, connecting the wires or straps between the battery cells and the circuit board is cumbersome and relatively expensive.

SUMMARY

Embodiments of the invention relate to a system and method for connecting individual battery cells to a circuit board in a simple and inexpensive way.

In one embodiment, the invention provides a harness for a battery pack. The harness includes a frame and an electric coupler assembly. The electric coupler assembly is fixed to the frame, and includes a plurality of cell couplings, a plurality of circuit board couplings, and a plurality of links. The links are cut after the electric coupler assembly is fixed to the frame. The electric coupler assembly provides individual electrical connections to a plurality of battery cells via the plurality of cell couplings and the plurality of circuit board couplings, following cutting of the links.

In another embodiment, the invention provides a method of manufacturing a battery pack. The battery pack includes a top housing, a bottom housing, a frame, a cell pad, a plurality of battery cells, a circuit board, and an electric coupler assembly having a plurality of links, a plurality of cell couplings, and a plurality of circuit board couplings. The method includes the acts of molding the electric coupler assembly into the frame, severing the plurality of links, attaching the battery cells to the plurality of cell couplings after the links have been severed, and attaching the circuit board to the plurality of circuit board couplings. The circuit board is electrically connected to each battery cell individually.

In another embodiment, the invention provides a power tool battery pack, including a bottom housing, a cell pad positioned in the bottom housing, a plurality of battery cells supported by the cell pad, an electric harness coupled to the plurality of battery cells, a circuit board supported on the frame, and a top housing secured to the bottom housing. The top and bottom housings substantially enclose the cell pad, the plurality of battery cells, and the electric harness. The electric harness includes a frame and an electric coupler assembly fixed to the frame. The electric coupler assembly includes a plurality of cell couplings, a plurality of circuit board couplings, and a plurality of links. The links are cut after the electric coupler assembly is fixed to the frame. The electric coupler assembly provides individual electrical connections to the plurality of battery cells via the plurality of cell couplings and the plurality of circuit board couplings following cutting of the links.

In one embodiment, the invention provides a battery pack including a top housing, a bottom housing, a cell pad, a plurality of battery cells, a harness, and a circuit board. The harness individually electrically couples the plurality of battery cells to the circuit board.

In another embodiment, the invention provides a method of manufacturing a battery pack. The method includes the acts of molding an electric coupler assembly into a frame, the assembly having a plurality of internal and external couplings connected together by a plurality of links; cutting the plurality of links between internal and external couplings; connecting a plurality of battery cells to cell couplings of the internal and external couplings; connecting a plurality of circuit board couplings of the internal and external couplings to a circuit board; and positioning the electric coupler assembly, frame, and battery cells in a housing.

In another embodiment, the invention provides a harness for a battery pack. The harness includes a frame and an electric coupler assembly having a plurality of internal and external electric couplings. The internal and external electric couplings include cell couplings and circuit board couplings. The internal and external couplings are held in place during manufacturing by links which are cut after the electric coupler assembly is molded into the frame.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Embodiments of the invention relate to an electric harness for a multi-cell battery pack. The electric harness includes a one or two piece electric coupler assembly having a plurality of electric couplers that couple a plurality of battery cells together in series and also couple each battery cell individually to a circuit board. Links hold the electric couplers in place during manufacturing and are cut to sever electrical connections between couplers, resulting in desired electrical connections for the battery pack.

Figure 1:
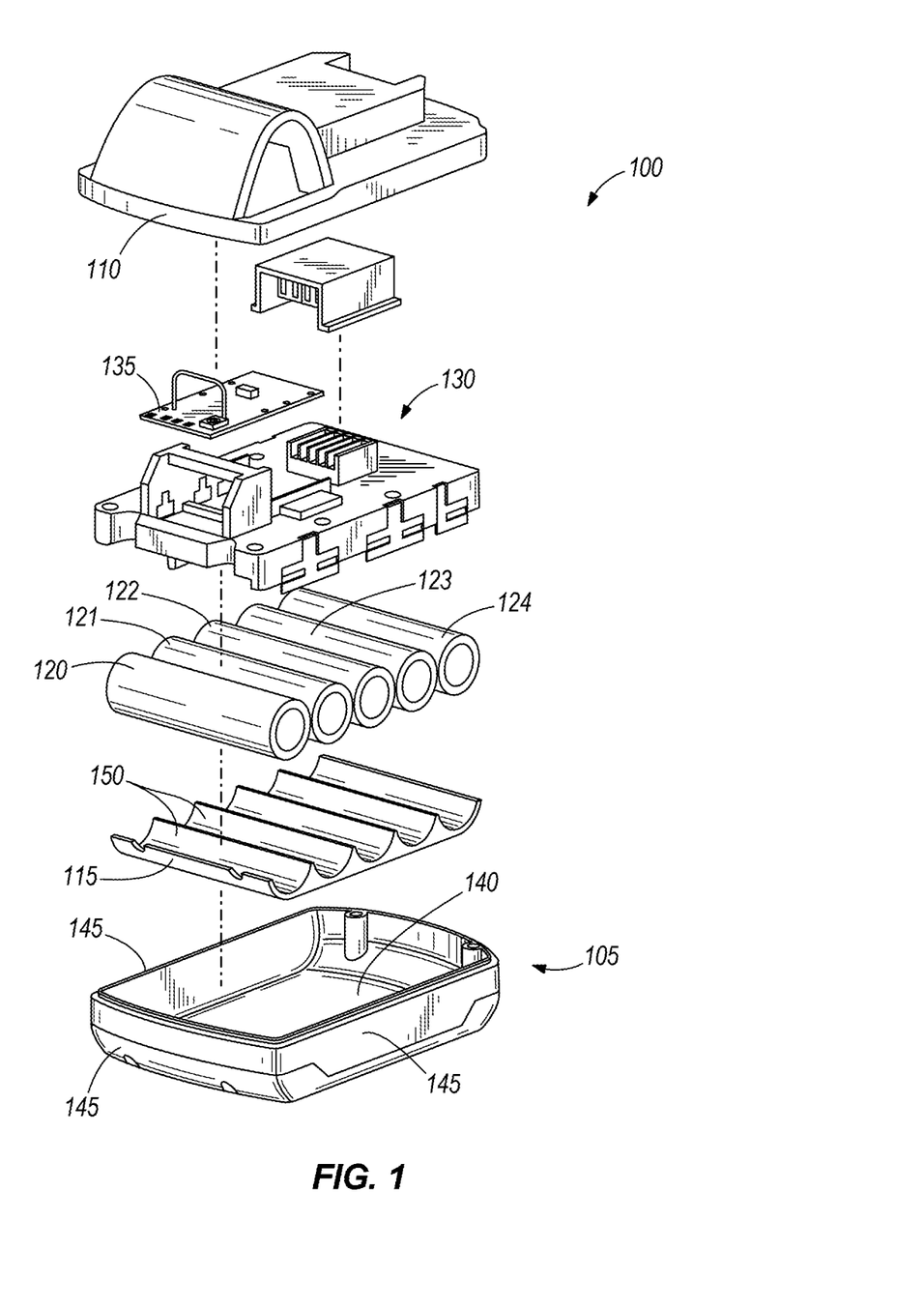
FIG. 1 is an exploded view of a battery pack incorporating an embodiment of the invention.

FIG. 1 illustrates an exploded view of a portion of an embodiment of a battery pack 100 incorporating the invention. Several components of the battery pack 100 have been removed for clarity. The battery pack 100 includes a bottom housing 105, a top housing 110, a cell pad 115, a plurality of rechargeable battery cells 120-124, an electric harness 130, and a circuit board 135.

In the embodiment shown, the bottom housing 105 is generally rectangular in shape and includes a base 140 and four walls 145. The bottom housing 105 is configured to receive and support the components of the battery pack 100 and can be manufactured using a suitable process (e.g., injection molding) and can be constructed of a suitable material (e.g., polycarbonate ABS).

The top housing 110 is shaped to conform to the components of the battery pack 100 and to be received by a power tool and/or battery charger. In some embodiments, the battery pack is removable from a tool. Alternatively, the battery pack can be integrated in a tool. The top housing 110 can be manufactured using a suitable process (e.g., injection molding) and can be constructed out of a suitable material (e.g., polycarbonate ABS). The top and bottom housings 110 and 105 are joined together and adhered to one another, enclosing substantially all of the other components of the battery pack 100, to seal and protect the components of the battery pack 100. In some embodiments, the top housing 110 is secured to the bottom housing 105 using suitable fasteners (e.g., screws).

In other embodiments, the top and bottom housings 110 and 105 can be shaped to support and enclose components having different shapes. For example, a battery pack can be constructed using rectangular and/or flat (e.g., prismatic) battery cells instead of the cylindrical cells shown in FIG. 1.

The cell pad 115 has a rectangular shape and includes a plurality of channels 150 configured to receive the battery cells 120-124. The cell pad 115 is positioned in the bottom housing 105 and supports the battery cells 120-124 in position, absorbing shock to the battery cells 120-124 (e.g., when the battery pack 100 is dropped). The cell pad 115 can be constructed of a suitable material such as a closed cell, flame retardant material (e.g., Volara®). In some embodiments, the cell pad 115 is flat and does not include the plurality of channels 150.

The battery cells 120-124 each have a positive terminal and a negative terminal. The battery cells 120-124 can have a suitable nominal voltage and can be constructed of a suitable chemistry (e.g., Li-ion, Li, Li—Co, Li—Mn, NiMH, NiCd, or other chemistry). In the embodiment shown, the battery cells 120-124 are cylindrical; however, battery cells having other shapes and sizes are contemplated with the invention.

Figure 2:
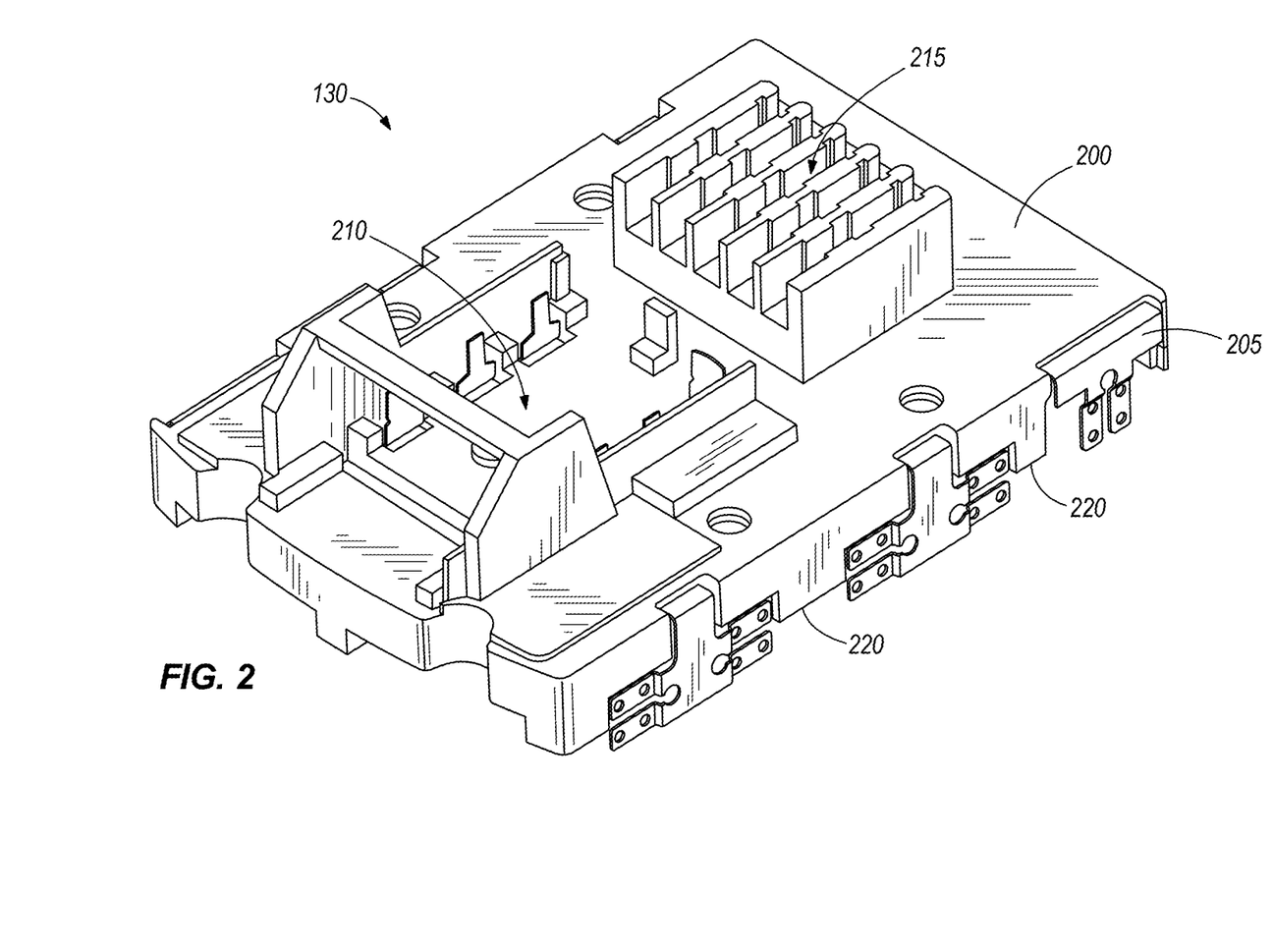
FIG. 2 is a perspective view of an electric harness according to an embodiment of the invention.

FIG. 2 illustrates an embodiment of the electric harness 130. The harness 130 includes a frame 200 and an electric coupler assembly 205 (shown in FIG. 3). The electric coupler assembly 205 is fixed to the frame 200 (e.g., adhered to the frame or molded into the frame, i.e., the frame 200 is molded around the electric coupler assembly 205). The frame 200 is constructed of a suitable material, such as FR-50 glass-filled nylon. The frame 200 includes a circuit board mounting section 210 and a terminal section 215. The terminal section 215 includes slots for terminals to couple a power tool and/or battery charger to the circuit board 135 and/or battery cells 120-124. The frame 200 can have "V" shaped channels (not shown) for receiving the battery cells 120-124. The "V" shaped channels provide two points of contact with the battery cells 120-124. The two points of contact hold the battery cells 120-124 in position, preventing the battery cells 120-124 from moving laterally. The frame 200 also includes walls 220 which trap the ends of the battery cells 120-124, preventing the battery cells 120-124 from moving end-to-end. Therefore, the frame 200, along with the cell pad 115, when positioned in the top and bottom housings 110 and 105, supports the battery cells 120-124, locking them in place and preventing them from moving.

Figure 3:
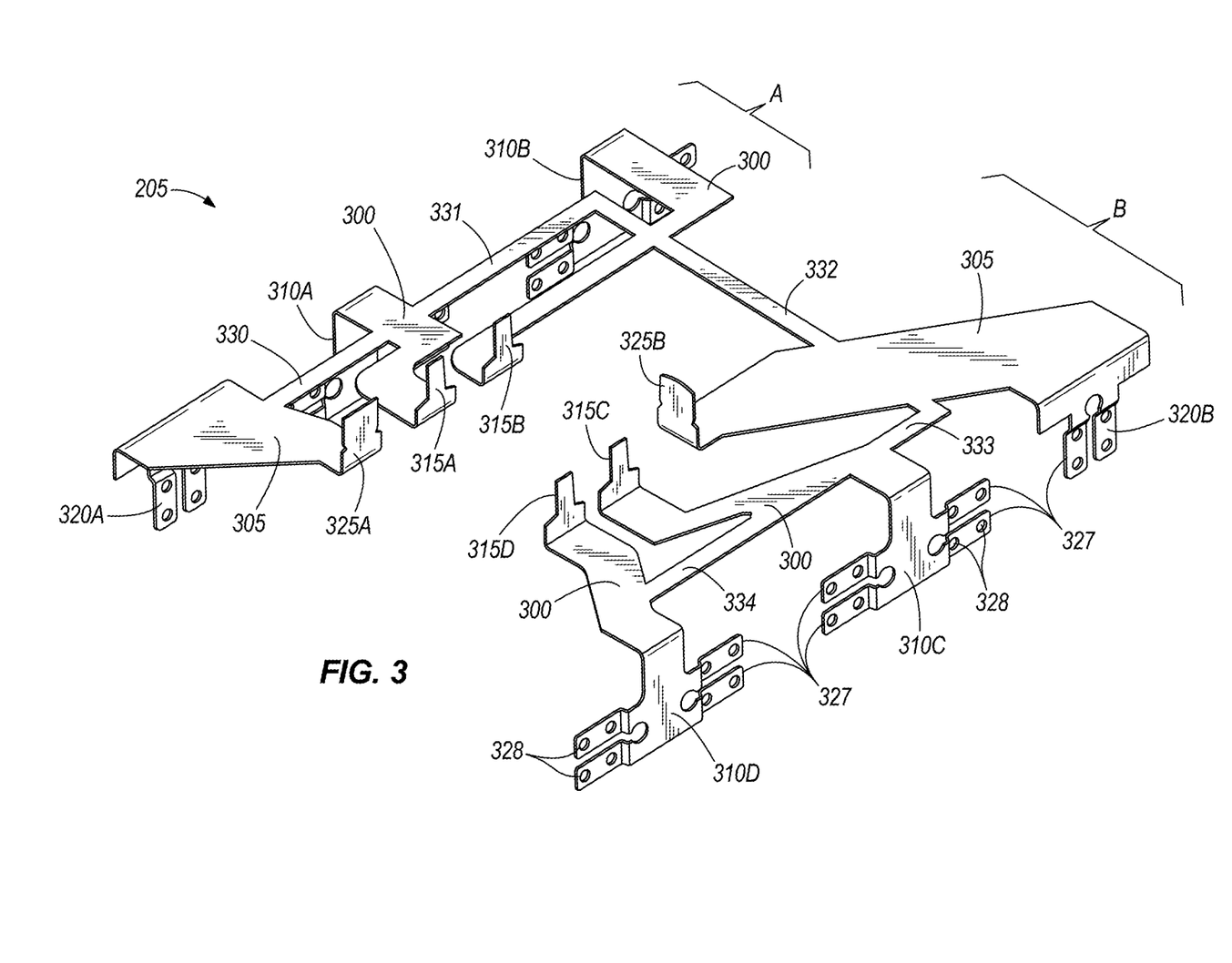
FIG. 3 is a perspective view of an electric coupling assembly according to an embodiment of the invention.

FIG. 3 illustrates an embodiment of the electric coupler assembly 205. The electric coupler assembly 205 includes a plurality of internal electric couplings 300 and a pair of external electric couplings 305. The internal electric couplings 300 include a plurality of adjacent cell couplings 310A-310D and a plurality of first circuit board couplings 315A-315D. Adjacent cell couplings 310A-310D electrically couple adjacent battery cells 120-124. For example, in a battery pack 100 having battery cells 120-124 connected in series, the cell coupling 310D couples a positive terminal battery cell 120 to a negative terminal of adjacent battery cell 121. The adjacent cell couplings 310A-310D are each connected to a respective circuit board coupling 315A-315D.

The external electric couplings 305 include cell couplings 320A and 320B and respective second circuit board couplings 325A and 325B connected together. The second circuit board couplings 325A and 325B, via their connection to the cell couplings 320A and 320B, provide the power from the entire battery pack 100 (i.e., all of the battery cells 120-124) to a power tool. Therefore, the second circuit board couplings 325A and 325B, and the cell couplings 320A and 320B, handle a larger current (e.g., when providing power to a power tool) than the internal electric couplings 300, and are constructed using material sufficient to withstand the larger current.

A plurality of links 330-334 hold the internal and external electric couplings 300 and 305 in place during manufacture of the battery pack 100 (e.g., prior to molding the electric coupler assembly 205 into the frame 200). Once the electric coupler assembly 205 is molded into the frame 200, the links 330-334 are cut to sever the electrical connection between the internal and external electric couplings 300 and 305. In some embodiments, the electric coupler assembly 205 is formed as two assemblies instead of one; for example, an electric coupler assembly A and an electric coupler assembly B can be formed by not including link 332.

The electric coupler assembly 205 can be formed from a flat sheet of suitable material (e.g., nickel) by stamping. The circuit board couplings 315A-315D and 325A-325D can then be bent in an upward direction, 90° from a plane formed by the flat sheet of material. The cell couplings 310A-310D and 320A-320B can be bent in a downward direction, 90° from the plane formed by the flat sheet of material. A plurality of connection tabs 327 formed as part of each cell coupling 310A-310D and 320A-320D are bent to offset the tabs 327 from the cell couplings 310A-310D and 320A-320B. The tabs 327 also include holes 328 to facilitate the flow of materials used in soldering and/or welding the tabs 327 to the battery cells 120-124. The flow of the welding/soldering material into the holes 328 results in a stronger physical and electrical connection between the tabs 327 and the cells 120-124. In some embodiments, the tabs 327 include dimples 328 to concentrate energy during welding and create a strong physical and electrical connection between the tabs 327 to the cells 120-124.

Figure 4:
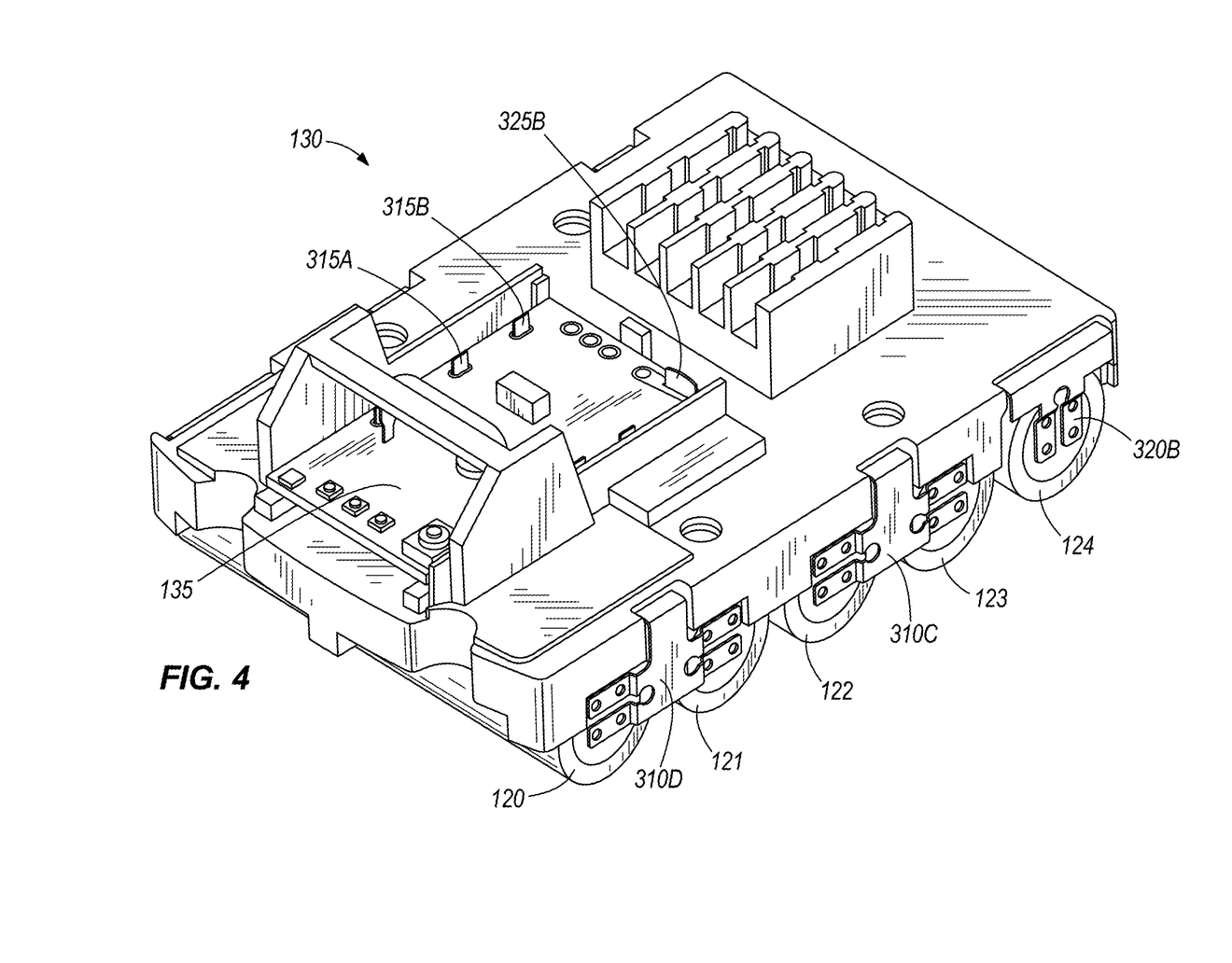
FIG. 4 is a perspective view of the electric harness of FIG. 2 including a plurality of battery cells and a circuit board according to an embodiment of the invention.

FIG. 4 illustrates the harness 130 assembled with the battery cells 120-124 and the circuit board 135. The battery cells 120-124 are attached to the cell couplings 310A-310D and 320A-320B by a suitable method (e.g., by welding). In addition, the circuit board couplings 315A-315D and 325A-325B are attached to the circuit board 135 by a suitable method (e.g., by soldering).

Figure 5A:
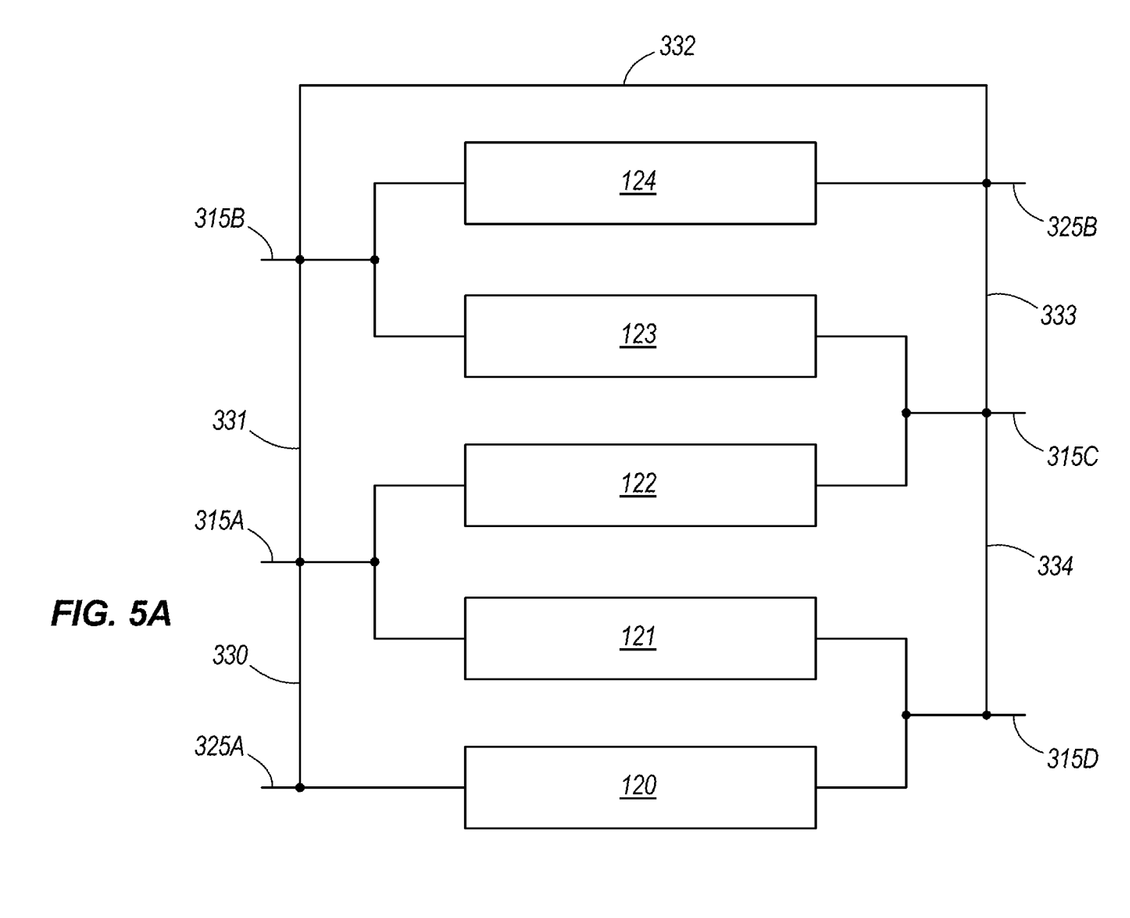
FIG. 5A is a schematic diagram of the electrical connections between the electric harness and the battery cells, of FIG. 4, with a plurality of links of the electric coupling assembly still in place.
Figure 5B:
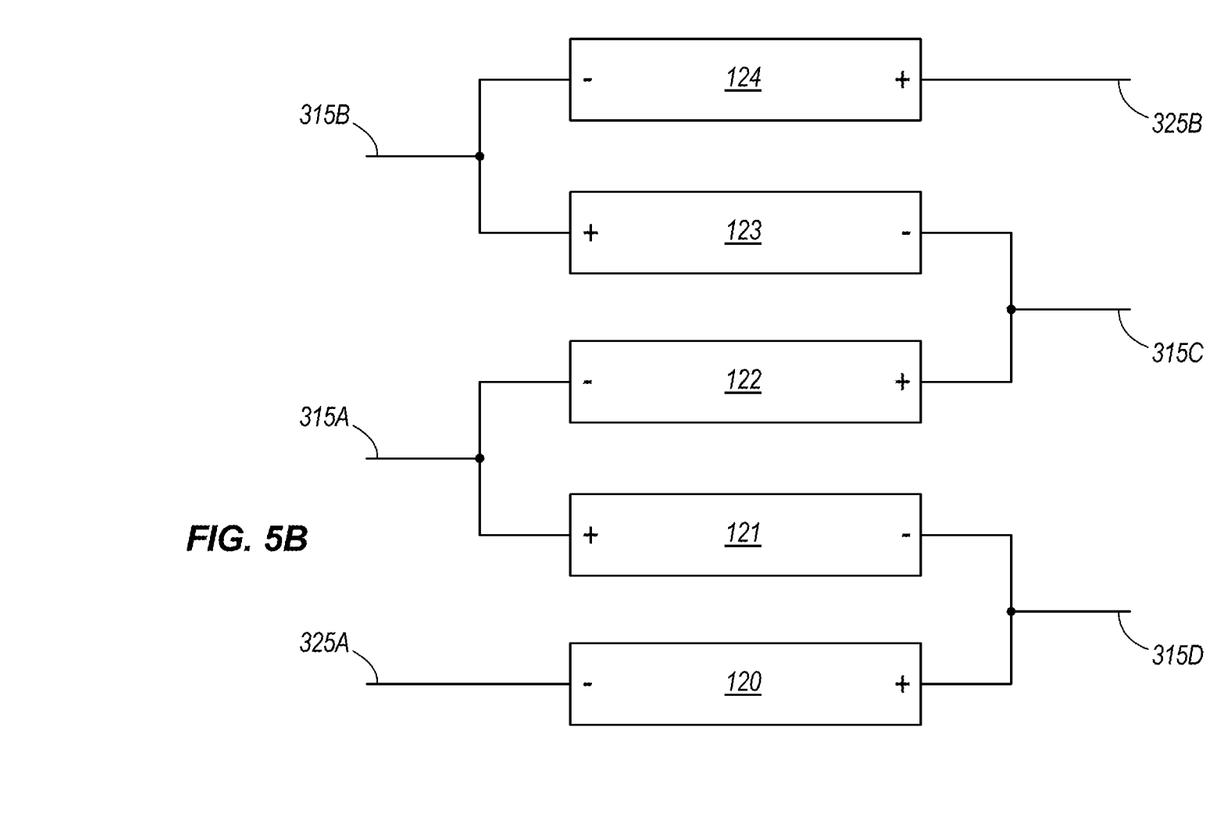
FIG. 5B is a schematic diagram of the electrical connections between the harness and the battery cells, of FIG. 4, with the links removed.

FIG. 5A illustrates the electrical connections of the harness 130 following molding of the electric coupler assembly 205 into the frame 200 and welding of the battery cells 120-124 to the battery cell couplings 310A-310D and 320A-320B, prior to cutting of the links 330-334. FIG. 5B illustrates the electrical connections of the harness 130 after the links 330-334 have been cut, and the battery cells 120-124 have been welded to the battery cell couplings 310A-310D and 320A-320B. In practice, the links 330-334 are cut following molding of the electric coupler assembly 205 into the frame 200 and prior to welding of the battery cells 120-124 to the battery cell couplings 310A-310D to prevent shorting of the battery cells 120-124.

The circuit board 135 can monitor and charge each battery cell 120-124 individually such as disclosed in co-pending U.S. patent application Ser. No. 11/138,070, filed May 25, 2005, the contents of which are hereby incorporated by reference. For example, access to battery cell 121 is across circuit board couplings 315A and 315D. Access to battery cell 122 is across circuit board couplings 315A and 315C. Power from the battery pack 100 (e.g., to a power tool) is provided across circuit board couplings 325A and 325B.

The embodiments shown and described enable a battery pack 100 to be assembled such that each battery cell 120-124 is coupled to one or more adjacent cells 120-124 in a series configuration and is also coupled to the circuit board 135. By welding and/or soldering each terminal of each cell 120-124 only once, manufacturing complexity and cost can be greatly reduced.

The invention has been described in embodiments of battery packs incorporating battery cells connected in series; however, the invention has application in any battery pack incorporating a plurality of battery cells, whether the battery cells are connected in series, parallel, or a combination thereof. Further, although the invention has been described in detail with reference to certain preferred embodiments (i.e., battery packs for power tools), variations and modifications exist within the scope and spirit of one or more independent aspects of the invention as described including, but not limited to, cars, planes, boats, toys, yard equipment, vacuum cleaners, cameras, computers, and audio equipment. In addition, embodiments of the invention can be used in high or low voltage applications.

Thus, the invention provides, among other things, a battery pack wherein each battery cell of the battery pack is coupled to a circuit board and to adjacent battery cells with a single weld. Various features and advantages of the invention are set forth in the following claims.

What is claimed is:

1. A method of manufacturing a battery pack including a top housing, a bottom housing, a frame, a cell pad, a plurality of battery cells, a circuit board, and an electric coupler assembly being formed from a single sheet of metal and having a plurality of links, a plurality of cell couplings, and a plurality of circuit board couplings, the plurality of cell couplings electrically connecting the plurality of battery cells, the plurality of links electrically connecting the plurality of cell couplings, the method comprising:

molding the frame around the electric coupler assembly into the frame;

after molding, severing the plurality of links between the plurality of cell couplings to provide desired electrical connections between the plurality of battery cells;

attaching the battery cells to the plurality of cell couplings after the links have been severed; and attaching the circuit board to the plurality of circuit board couplings;

wherein the circuit board is electrically connected to each battery cell individually.

2. The method of claim 1, further comprising supporting the battery cells by the cell pad.

3. The method of claim 1, further comprising enclosing the frame, the electric coupler assembly, the cell pad, the plurality of battery cells, and the circuit board in the top and bottom housing.

4. The method of claim 1, further comprising stamping the electric coupler assembly from a single piece of flat material.

5. The method of claim 4, further comprising bending the plurality of circuit board couplings in a first direction substantially 90 degrees from a plane formed by the flat material.

6. The method of claim 5, further comprising bending the plurality of cell couplings in a second direction substantially 90 degrees from the plane of the flat material, the second direct opposite the first direction.

7. The method of claim 1, wherein the attaching of the battery cells to the cell couplings includes one of welding and soldering.

8. The method of claim 1, further comprising supporting the battery cells by the frame, the electric coupler assembly, the cell pad, and the lower housing to prevent movement of the battery cells.

9. The method of claim 1, further comprising supporting the circuit board on the frame.

10. The method of claim 1, wherein severing the plurality of links severs the electrical connection between the plurality of cell couplings, each of the cell couplings providing an individual electrical connection to at least one of the plurality of battery cells.

11. The method of claim 1, wherein the electric coupler assembly includes a plurality of electric couplings, each of the plurality of electric couplings having at least one cell coupling and a circuit board coupling, each link being connected between adjacent electric couplings, and wherein severing the plurality of links severs an electrical connection between adjacent electric couplings.

12. The method of claim 1, wherein molding the electric coupler assembly into the frame includes molding the frame around the electric coupler assembly.

13. A method of manufacturing a battery pack, the method comprising:

providing an electric coupler assembly being formed from a single sheet of metal and including a plurality of electric couplings and a plurality of links connected between adjacent ones of the plurality of electric couplings, each of the plurality of electric couplings being formed to include at least one cell coupling;

fixing the electric coupler assembly to a frame;

after fixing, severing the plurality of links between the adjacent ones of the electric couplings; and after severing, attaching a battery cell to each of the plurality of cell couplings with desired electrical connections between the plurality of battery cells provided by severing the plurality of links.

14. The method of claim 13, wherein fixing the electric coupler assembly to the frame includes adhering the electric coupler assembly to the frame.

15. The method of claim 13, wherein fixing the electric coupler assembly to the frame includes molding the electric coupler assembly into the frame.

16. The method of claim 15, wherein molding the electric coupler assembly into the frame includes molding the frame around the electric coupler assembly.

17. The method of claim 13, wherein forming an electric coupler assembly includes forming each of the plurality of electric couplings to include a circuit board coupling, and wherein the method further comprises attaching a circuit board to the plurality of circuit board couplings, the circuit board being electrically connected to each battery cell individually.

18. The method of claim 13, further comprising supporting the frame, the electric coupler assembly and the plurality of battery cells in a battery pack housing.

19. A method of manufacturing a battery pack, the method comprising:

providing an electric coupler assembly being formed from a single sheet of metal and including a plurality of electric couplings and a plurality of links connected between adjacent ones of the plurality of electric couplings, each of the plurality of electric couplings being formed to include at least one cell coupling;

molding a frame around the electric coupler assembly;

after molding, severing the plurality of links between the adjacent ones of the electric couplings;

after severing, attaching battery cells to the plurality of cell couplings;

and supporting the frame, the electric coupler assembly and the plurality of battery cells in a battery pack housing.

20. The method of claim 13, wherein forming an electric coupler assembly includes forming each of the plurality of electric couplings to include a circuit board coupling, and wherein the method further comprises attaching a circuit board to the plurality of circuit board couplings, the circuit board being electrically connected to each battery cell individually.

* * * * *